Patented Nov. 7, 1922.

1,434,634

UNITED STATES PATENT OFFICE.

VIRGIL B. SEASE, OF PARLIN, NEW JERSEY, ASSIGNOR TO E. I. DU PONT DE NEMOURS & COMPANY, OF WILMINGTON, DELAWARE, A CORPORATION OF DELAWARE.

CELLULOSE-ACETATE-SOLVENT COMPOSITION.

No Drawing. Application filed February 3, 1921. Serial No. 442,275.

*To all whom it may concern:*

Be it known that I, VIRGIL B. SEASE, a citizen of the United States, and a resident of Parlin, in the county of Middlesex and State of New Jersey, have invented a certain new and useful Cellulose-Acetate-Solvent Composition, of which the following is a specification.

This invention relates to solutions of cellulose acetate and to new solvents therefor, and comprises, as a new solvent, a mixture of acetone, ethyl acetate, and a substance each of whose molecules may be formed through condensation of two molecules of acetone and which may be termed an acetone-condensation product. For this third ingredient I prefer mesityl oxide, but I may use, instead, diacetone alcohol, or a mixture of the two.

The chief advantages of this new solvent are manifested when it is used in conjunction with cellulose acetate in the manufacture of photographic, and especially cinematographic, film. In attempting to develop a cellulose acetate solution which would be suitable for casting to form a film, it soon became evident that it would be necessary to use a solvent mixture containing some solvent or solvents with appreciably higher boiling points than that of acetone, because films cast from acetone solutions dried too rapidly, forming a skin on the surface of the freshly poured film, which skin buckled giving a final film of non-uniform thickness.

After trial of numerous solvent mixtures, it was observed that a mixture of acetone and ethyl acetate, together with mesityl oxide or diacetone alcohol had very desirable properties. This solvent formula not only behaved in a very satisfactory manner with respect to drying, but left an unusually tough and flexible film.

The following formula gives the limits of the parts by weight of the solvents which it has been found desirable to use in making the solvent mixture in the manufacture of photographic film.

|  |  | Parts by wt. |
|---|---|---|
| I. | Acetone | 65-80 |
|  | Ethyl acetate | 25-15 |
|  | Diacetone alcohol | 10- 5 |
| II. | Acetone | 65-75 |
|  | Ethyl acetate | 20-15 |
|  | Mesityl oxide | 15-10 |

Very satisfactory results have been obtained throughout the investigation by the use of the following formula:

|  |  | Parts by wt. |
|---|---|---|
| III. | Acetone | 65 |
|  | Ethyl acetate | 25 |
|  | Mesityl oxide | 3 |
|  | Diacetone alcohol | 7 |

This formula has been found to give dope which dries at the desired rate.

In making a cellulose acetate solution according to my invention, the solvent mixture above described is first prepared and there is then dissolved therein cellulose acetate and a softener, for example, camphor or camphor substitute, such as mannol, or ethyl or methyl phthalate, etc. The exact proportions of the several ingredients will, of course, depend upon the purpose for which the composition is to be used. For a photographic film I preferably use with each 18 parts of cellulose acetate, from 75 to 80 parts of the solvent mixture, and from 2 to 4 parts of softener. I prefer to use a cellulose acetate which is well hydrated and soluble in hot benzene-alcohol and in hot aqueous alcohol.

Generally speaking I may use with formulæ 1, 2, or 3, 23 parts of cellulose acetate, and a suitable softener therefor.

It will be understood that the ranges of solvent ingredients given above have special reference to the making of photographic film. When the cellulose acetate solution is to be used for other purposes the proportions may be either above or below the ranges above specified. Thus mesityl oxide may be used in place of diacetone alcohol in Formula I.

I claim:—

1. A liquid composition comprising acetone, ethyl acetate, and a substance each of whose molecules may be formed through condensation of two molecules of acetone.

2. A liquid composition comprising acetone, ethyl acetate, and mesityl oxide.

3. A liquid composition comprising acetone, ethyl acetate, and an acetone-condensation product.

4. A liquid composition comprising acetone, ethyl acetate, a substance each of whose molecules may be formed through condensation of two molecules of acetone, cellulose acetate, and a softener for said cellulose acetate.

5. A liquid composition comprising acetone, ethyl acetate, mesityl oxide, cellulose acetate, and a softener for said cellulose acetate.

6. A liquid composition comprising acetone, ethyl acetate, an acetone-condensation product, cellulose acetate, and a softener for said cellulose acetate.

7. A liquid composition comprising 65 to 80 parts of acetone, from about 25 to 15 parts of ethyl acetate, and from about 10 to 5 parts of a product formed through condensation of acetone and comprising mesityl oxide.

8. A liquid composition comprising 65 parts of acetone, about 25 parts of ethyl acetate, about 3 parts of mesityl oxide, and about 7 parts of diacetone alcohol.

9. A liquid composition comprising 65 to 80 parts of acetone, from about 25 to 15 parts of ethyl acetate, about 23 parts of cellulose acetate soluble in hot benzene-alcohol and in hot aqueous alcohol, a softener for said cellulose acetate, and from about 10 to 5 parts of a product formed through condensation of acetone and comprising mesityl oxide.

10. A liquid composition comprising 65 parts of acetone, about 25 parts of ethyl acetate, about 3 parts of mesityl oxide, about 7 parts of diacetone alcohol, about 23 parts of cellulose acetate soluble in hot benzene-alcohol and in aqueous alcohol, and a softener for said cellulose acetate.

In testimony whereof I affix my signature.

VIRGIL B. SEASE.